United States Patent [19]

Abe

[11] 4,251,313
[45] Feb. 17, 1981

[54] WEB RETAINING DEVICE FOR A CORRUGATION MACHINE

[75] Inventor: Etsuro Abe, Nagoya, Japan

[73] Assignee: Isowa Industry Co., Ltd., Nagoya, Japan

[21] Appl. No.: 940,025

[22] Filed: Sep. 6, 1978

[30] Foreign Application Priority Data

Oct. 3, 1977 [JP] Japan .................................. 52-119817

[51] Int. Cl.$^3$ ............................................. B31F 1/00
[52] U.S. Cl. .................................. 156/473; 156/205; 156/210; 156/285; 156/462; 156/499; 156/582; 156/472; 425/388; 264/286
[58] Field of Search ........ 156/473, 472, 471, 205–210, 156/285, 462, 470, 499, 582; 425/388; 264/286

[56] References Cited

U.S. PATENT DOCUMENTS

| 2,068,155 | 1/1937 | Swift | 156/473 |
| 3,837,973 | 9/1974 | Asakura et al. | 156/473 |
| 4,177,102 | 12/1979 | Tokuno | 156/472 |

*Primary Examiner*—John T. Goolkasian
*Assistant Examiner*—Lois E. Boland
*Attorney, Agent, or Firm*—Fleit & Jacobson

[57] ABSTRACT

A paper web is passed between a pair of first and second corrugating rolls to form corrugations therein. The second corrugating roll is provided with a plurality of longitudinally spaced annular suction grooves in communication with a suction device from which subatmospheric pressure is applied through the annular suction grooves to the corrugated web, while it is travelling around the second corrugating roll, retaining the corrugations in the flutes of the roll.

8 Claims, 3 Drawing Figures

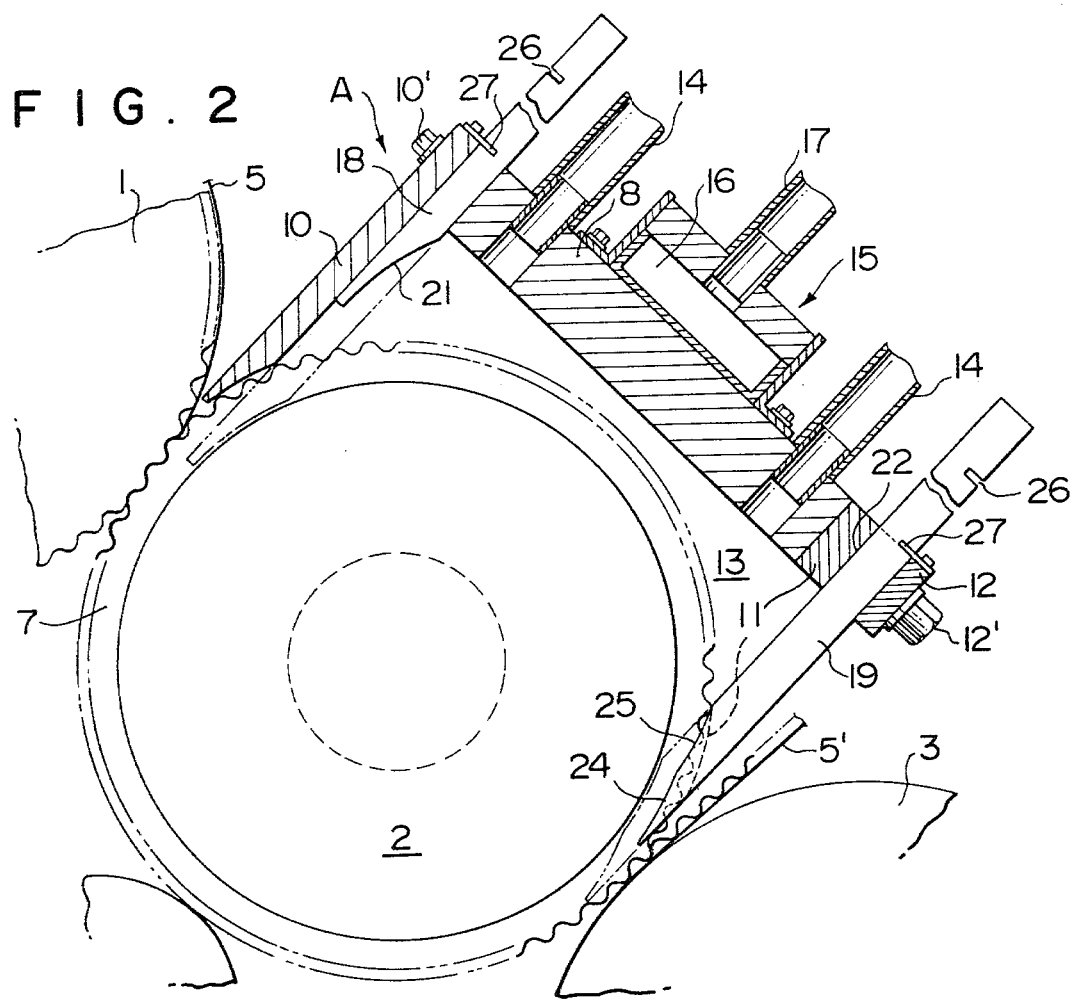

WEB RETAINING DEVICE FOR A CORRUGATION MACHINE

This invention relates to a paper web retaining apparatus of single facing machines which are used in production of single faced corrugated paperboards.

A single facing machine of the general type which has been used in production of single faced corrugated paperboard comprises a pair of first and second corrugating rolls meshing with each other, between which a paper web is passed to form corrugations therein, means for applying glue to the peaks of the corrugated web while it is being carried around the second corrugating roll, a pressure roll for pressing a facing sheet into contact with the glue applied peaks of the corrugated web to form a single faced corrugated paperboard, and finger plates for retaining the corrugated web around the second corrugated roll to prevent separation of the corrugated web from the corrugating roll due to the centrifugal force while the corrugated web is travelling around the corrugating roll. With this arrangement, the finger plates in contact with the moving corrugated paper web will wear due to friction between the finger plates and the web. In this case, it is required to adjust the position of the worn finger plates relative to the second corrugating roll in order to retain the corrugations in the flutes of the roll. If such adjustment were to be made improperly, the corrugations in the web would be deformed to such an extent that glue would be unevenly applied to the peaks of the corrugated web. This will result in deterioration of quality of the produced corrugated paperboard. The single facing machine of the above type has another disadvantage in that due to the fact that the finger plates are positioned above the second corrugating roll along its length at short intervals, for example, at pitches of about 100 mm, the glue can not be applied to portions of the peaks of the corrugations facing the finger plates so that glue-free lines will be formed on the corrugated web along its length.

In order to overcome the disadvantages set forth above, it has been proposed heretofore to provide instead of the finger plate, means for ejecting air under pressure onto the outer surface of a corrugated web to urge it into contact with the periphery of the second corrugating roll. The use of compressed air is satisfactory to retain the corrugated web on the peripheral surface of the second corrugating roll, but has a disadvantage in that glue applied to the peaks of the corrugating paper web is blown away by ejection of the compressed air onto the web. This has an important effect upon the required adhesive force to glue the facing sheet to the corrugated web.

An object of the invention is to provide a new paper web retaining apparatus which can overcome the above disadvantages in the single facing machine.

Another object of the invention is to provide a single facing machine wherein corrugations are formed in a paper web by passing it between a first corrugating roll and a second corrugating roll meshing with each other and retained in the flutes of the second corrugating roll by applying subatmospheric pressure to the corrugated web during passage around the roll.

In accordance with the present invention, there is provided a single facing machine comprising a pair of first and second corrugating rolls meshing with each other, between which a paper web is passed to form corrugations therein, a glue applicator for applying glue to the peaks of the corrugated paper web and a pressure roll by which a facing sheet is pressed into contact with the glue applied peaks of the corrugated web, while it is travelling around the second corrugating roll, to form a single faced corrugated paperboard, wherein said second corrugating roll is provided with a plurality of longitudinally spaced annular suction grooves formed in the peripheral surface thereof, and there is provided on the side of the second corrugating roll opposite to the glue applicator, suction means for applying subatmospheric pressure through the annular suction grooves to the corrugated paper web during travel of it around the corrugating roll from the meshing point between the first and second corrugating rolls to the contact point between the second roll and the pressure roll to suck the web onto the second roll, thereby retaining the corrugations in the web in the flutes of the roll.

Preferably, the suction means comprises a suction or vacuum chamber receiving partially the second corrugating roll and connected to a source of vacuum. The suction chamber may be defined by a top support member, end walls positioned adjacent the end faces of the second corrugating roll and secured to the support member, and front and rear walls secured to the support member and extending towards the meshing point between the first and second corrugating rolls and the contact point between the pressure roll and the second corrugating roll, respectively.

The suction means may include adjustable restricting plates having separators adapted to facilitate separation of the sucked corrugated web from the second corrugating roll after the facing sheet has been glued to the peaks of the corrugated web. The adjustable restricting plates are positioned in vertical grooves in the rear wall so that the separators extend into the annular suction grooves in the second corrugating roll. The adjustable restricting plates have arcuate surfaces extending upwardly of the separators and adapted to cooperate with the bottoms of the annular suction grooves, thus preventing the lower portions of the annular suction grooves from communicating with the vacuum chamber when the restricting plates are moved downwardly. The suction means may also include front restricting plates lying inside the front wall, the restricting plates having arcuate surfaces which are adapted to cooperate with the bottom of the annular suction grooves so that communication of the vacuum chamber with the lower portions of the annular suction grooves is prevented by inserting the lower ends of the restricting plates into the grooves in the same manner as in the lower restricting plates.

The above and further objects and novel features of the invention will appear more fully from the following detailed description when the same is read in connection with the accompanying drawings. In the drawings;

FIG. 2 is a cross-sectional view of the paper web retaining apparatus; and

Figure 1:
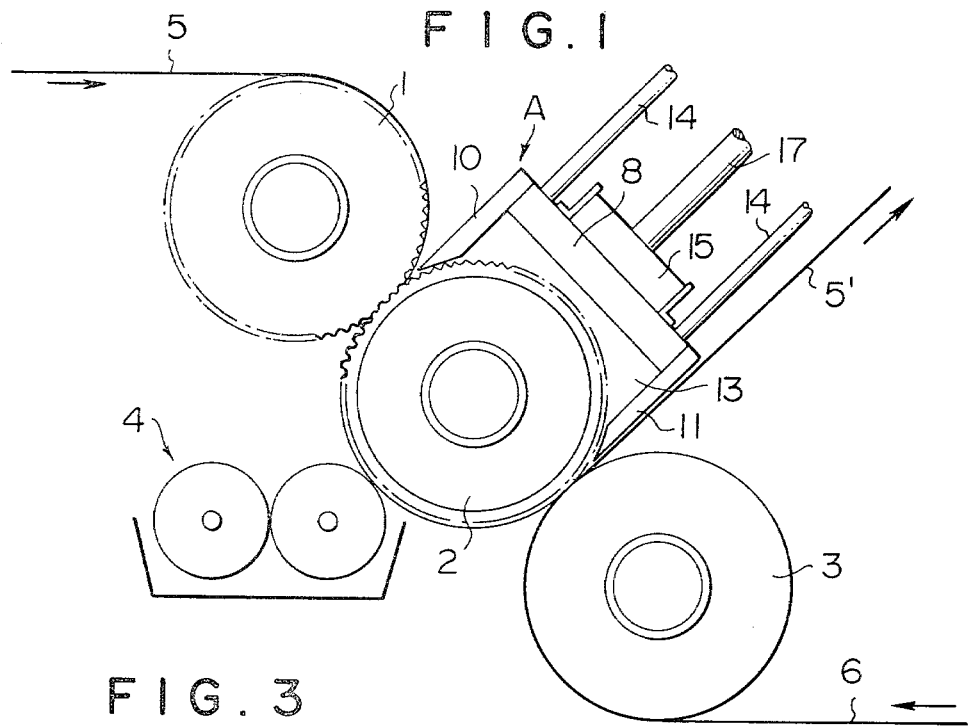
FIG. 1 is a schematic side view of a single facing machine for production of a single faced corrugated paperboard having a paper web retaining apparatus of the invention.
Figure 3:
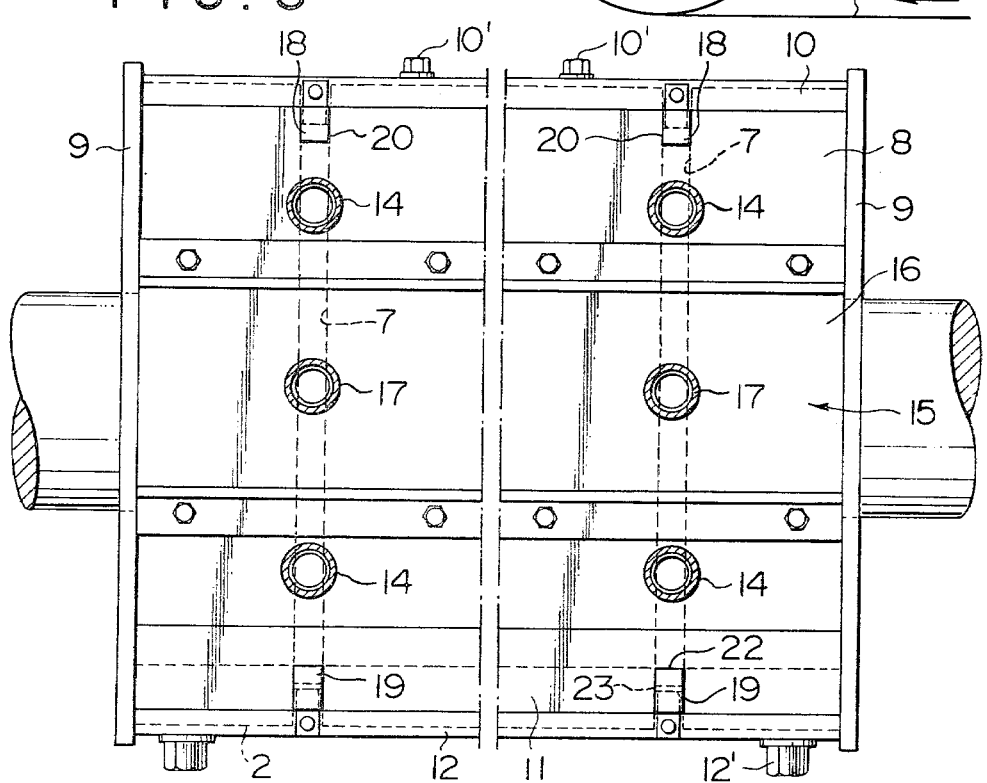
FIG. 3 is a top plan view of the web retaining apparatus.

Referring to FIG. 1 of the drawings, there is shown a single facing machine comprising a first corrugating roll 1 and a second corrugating roll 2 meshing with each other. A paper web 5 is passed between the first and second corrugating rolls 1 and 2 to form corrugations therein. A glue applicator 4 applies glue to the peaks of the corrugated paper web while it is travelling around the second corrugating roll. A facing sheet 6 is passed between the second corrugating roll 2 and a pressure roll 3 and pressed into contact with the glue applied peaks of the corrugated web 5 by the pressure roll 3 to form a single faced corrugated paperboard 5'.

The second courrugating roll 2 is provided with a plurality of longitudinally spaced annular suction grooves 7, each of which may be of any suitable width and depth. In the preferred embodiment of the invention, each annular suction groove 7 is 5 mm in width. A space between the adjacent suction grooves may be in the range from 10 cm to 15 cm. Suction means A is provided on the side of the second corrugating roll 2 opposite to the glue applicator 4 and comprises a top support member 8, end walls 9, 9 disposed adjacent the upper portions of the end faces of the second corrugating roll 2 and secured to the top support member 8, and front and rear walls 10 and 11. The front wall 10 is secured at its upper end to the support member 8 by means of bolts 10' and the rear wall 11 is secured at its upper end to the support member 8 by means of a retaining plate 12 and bolts 12'. The front and rear walls 10 and 11 extend towards the meshed point between the first and second corrugating rolls 1 and 2 and the contact point between the second corrugating roll 2 and the pressure roll 3, respectively, and with the end walls 9, 9 define a suction or vacuum chamber 13 receiving the upper half of the peripheral surface of the second corrugating roll 2. The annular suction grooves 7 in the second corrugating roll 2 communicate with the vacuum chamber 13 which is connected through suction pipes 14 to any suitable source of vacuum (not shown), the suction pipes 14 being secured to the support member 8.

The suction means is preferably heated in the same manner as the corrugating rolls are internally heated. Such heating means 15 is positioned on the support member 8 and has a heating chamber 16 into which heating steam is introduced from a source of steam through a supply pipe 17. The heating steam from the chamber 16 is discharged through a suitable discharge pipe (not shown).

Front and rear restricting plates 18 and 19 are provided in aligned relation with the annular suction grooves 7 in the second corrugated roll 2. Openings 20 are formed in the support member 8 adjacent the front wall 10. The front restricting plates 18 extend through the openings 20 into the vacuum chamber 13 and are provided with arcuate surfaces 21 at the lower ends thereof which are adapted to cooperate with the bottom of the suction grooves 7. The rear wall 11 has vertically extending grooves 23 formed therein. Openings 22 are defined by the grooves 23 and the retaining plate 12 secured to the rear wall 11. The rear restricting plates 19 extend through the openings 22 and vertical grooves 23 into the suction grooves 7 and are provided at the lower ends thereof with separators 24 adapted to facilitate separation of the sucked corrugated web 5 from the corrugating roll 2. Each of the separators 24 is so chamferred as to form a proper gap between the separator and the suction groove 7 in the second corrugating roll 2.

The rear restricting plates 19 are also provided arcuate surfaces 25 extending upwardly of the separators 24 and adapted to cooperate with the bottoms of the suction grooves 7. The front and rear restricting plates 18 and 19 are retained in their normal upper position where the arcuate surfaces 21 and 25 are maintained in separated relation from the bottoms of the suction grooves 7. When it is desired to produce a single faced corrugated paperboard having a width less than that of the corrugating rolls, the restricting plates 18 and 19 lying outside the corrugated web are moved downwardly until the arcuate surfaces 21 and 25 have engaged the bottoms of the corresponding suction grooves 7 and retained in the engaged position. In order to retain the restricting plates 18 and 19 in either of two positions, they are provided with a pair of longitudinally spaced slots 26, either of which is engaged by each of latches 27 pivoted to the front wall and the retaining plate on their upper surfaces.

In operation, the air in the vacuum chamber 13 is evacuated through the suction pipe 14 by the source of vacuum to establish subatmospheric pressure therein. This subatmospheric pressure in the vacuum chamber 13 is applied through the annular suction grooves 7 to the corrugated paper web 5, while it is travelling around the second corrugating roll 2 from the meshing point between the first and second corrugating rolls 1 and 2 to the contact point between the roll 2 and the pressure roll 3, to cause the web 5 to be sucked onto the lower half of the peripheral surface of the roll 2, thereby retaining the corrugations in the flutes of the roll 2. The glue applicator 4 applies glue to the peaks on the outer surface of the sucked corrugated web 5. Facing sheet 6 is pressed into contact with the glue applied peaks of the corrugated web by the pressure roll 3 to form a single faced corrugated paperboard 5'. The corrugated web of the paperboard thus formed is progressively separated from the corrugating roll 2 by the separators 24 of the restricting plates 19 acting against the force of suction.

When it is desired to produce a single faced corrugated paperboard having a width less than that of the corrugating rolls, the arcuate surfaces 21 and 25 are brought into engagement with the bottoms of the suction grooves 7 by downward movement of the front and rear restricting plates 18 and 19 so that these restricting plates prevent communication between the lower portions of the suction grooves and the vacuum chamber 13. Thus, no suction is lost through the annular suction grooves lying beyond the width of the corrugated web.

It will be understood from the above description that subatmospheric pressure applied through the annular sucton grooves to the corrugated web completely prevents the tendency for the web to separate from the second corrugating roll because of the centrifugal force. It will be also noted that due to the fact that the corrugations in the web are retained in the flutes of the corrugating roll by the force of suction, glue can be uniformly applied to the peaks of the corrugated web from its edge to edge without leaving glue-free lines.

I claim:

1. In a corrugating machine, a web retaining device comprising a pair of first and second corrugating rolls having flutes meshing with each other to define a first contact region, between which a web is passed to form corrugations therein, a pressure roll cooperating with said second corrugating roll to press a facing sheet into contact with a corrugated web and to define a second contact region, the web contacting the second corrugating roll at the first contact region, traveling with the second corrugating roll from the first to the second contact region, and exiting from the second corrugating roll at the second contact region, said second corrugating roll being provided with a plurality of longitudinally spaced annular suction grooves formed in the peripheral surface therof, and suction means for applying subatmospheric pressure to the second corrugating roll over the uncovered surface thereof between the second contact region and the first contact region and through said annular suction grooves to the corrugated web during its travel around said second corrugating roll between said first corrugating roll and said pressure roll, the applied pressure sucking the corrugated web onto said second corrugating roll and retaining the corrugations in the flutes of the roll while the corrugated web is in transit from said first to said second contact region, said suction means comprising a suction chamber extending axially relative to the second corrugating roll at least equal to the web width and positioned to cover the uncovered peripheral surface of said second corrugating roll as it rotates between said second and said first contact regions, and said suction chamber adapted to supply subatmospheric pressure to the said uncovered peripheral surface and to portions of said rotating annular suction grooves covered by the corrugated web and including first wall means extending towards and terminating closely adjacent the first contact region defined by the meshing of the first and second corrugating rolls, and second wall means extending towards and terminating closely adjacent the second contact region defined by the second corrugating and pressure rolls, the wall means and associated rolls defining seals for substantially maintaining the integrity of the subatmospheric pressure being applied by the suction chamber.

2. A web retaining device according to claim 1 wherein the suction chamber comprises a top support member, and end walls positioned adjacent end faces of the second corrugating roll and secured to the support member, said first and second wall means being secured to the support member.

3. A web retaining device according to claim 2, wherein the pressure roll bonds a facing sheet to peaks of the web and wherein the device further includes restricting plates having at their lower ends separators adapted to facilitate separation of the sucked corrugated web from the second corrugating roll after the facing sheet has been bonded to the peaks of the web.

4. A web retaining device according to claim 1, further comprising means operatively associated with said suction chamber for heating the said suction chamber.

5. A web retaining device according to claim 1, wherein the pressure roll bonds a facing sheet to peaks of the web and wherein the device further includes restricting plates having at their lower ends separators adapted to facilitate separation of the sucked corrugated web from the second corrugating roll after the facing sheet has been bonded to the peaks of the web.

6. A web retaining device according to claim 5, wherein said suction means includes a top support member for supporting said restricting plates, a predetermined number of said restricting plates being adjustably supported by said top support member, said predetermined number of restricting plates having arcuate shaped lower end portions selectively movable into selected ones of said longitudinally spaced annular suction grooves to reduce the effective size of said suction chamber.

7. A web retaining device according to claim 1, wherein the ends of said first and said second wall means have arcuate shapes complementary to the periphery of said second corrugating roll.

8. A web retaining device according to claim 1, wherein the corrugating machine is a single-facing machine, and wherein the retained web is a paper web.

* * * * *